(12) United States Patent
Cuff et al.

(10) Patent No.: US 9,307,372 B2
(45) Date of Patent: Apr. 5, 2016

(54) NO RESPONDERS ONLINE

(71) Applicant: TeleCommunication Systems, Inc., Annapolis, MD (US)

(72) Inventors: Michael Cuff, Clyde Hill, WA (US); Chih Wang, Bothell, WA (US); Farhad Kasad, Bothell, WA (US); Firdaus Aryana, Seattle, WA (US); Gordon J. Hines, Kirkland, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 33 days.

(21) Appl. No.: 13/847,237

(22) Filed: Mar. 19, 2013

(65) Prior Publication Data

US 2013/0267189 A1    Oct. 10, 2013

Related U.S. Application Data

(60) Provisional application No. 61/615,580, filed on Mar. 26, 2012.

(51) Int. Cl.
  *H04M 11/04* (2006.01)
  *H04W 4/14* (2009.01)
  *H04W 4/22* (2009.01)

(52) U.S. Cl.
  CPC . *H04W 4/14* (2013.01); *H04W 4/22* (2013.01)

(58) Field of Classification Search
  CPC ............................ H04M 11/04; H04M 11/045
  USPC ................ 455/404.1, 404.2, 521, 414.4, 466; 379/37
  See application file for complete search history.

(56) References Cited

U.S. PATENT DOCUMENTS

| 1,103,073 A | | 7/1914 | O'Connel |
| 4,320,395 A | * | 3/1982 | Meissen et al. ............... 345/685 |

(Continued)

FOREIGN PATENT DOCUMENTS

| WO | WO99/21380 | 10/1998 |
| WO | WO01/45342 | 6/2001 |

(Continued)

OTHER PUBLICATIONS

Le-Pond Chin, Jyh-Hong Wen, Ting-Way Liu, The Study of the Interconnection of GSM Mobile Communications Systems Over IP Based Network, May 6, 2001, IEEE, Vehicular Technology Conference, vol. 3, pp. 2219-2223.

(Continued)

*Primary Examiner* — David Q Nguyen
(74) *Attorney, Agent, or Firm* — William H. Bollman

(57) ABSTRACT

A rapid assignment dynamic ownership queue for text message sessions queues incoming text messages destined for a service bureau, at a network server. Simultaneous access is provided to any one text message of the queued incoming text messages to a plurality of operator terminals at the service bureau. Initial ownership of the one text message is assigned as a result of a first acting terminal of the plurality of operator terminals having completed an action in service to the text message, and ownership is re-assigned to a subsequent operator terminal having completed another action in service to the text message after the first acting terminal. A configurable escalation queue may be implemented to assign an escalation code to each queued item, regardless of its position in the queue list, to alter the presentation of the queue item. A No Responders Online feature can indicate if all terminal devices are "offline".

15 Claims, 4 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,737,916 A | 4/1988 | Ogawa |
| 4,891,638 A | 1/1990 | Davis |
| 4,891,650 A | 1/1990 | Sheffer |
| 4,928,107 A | 5/1990 | Kuroda |
| 4,939,662 A | 7/1990 | Numura |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,389,934 A | 2/1995 | Kass |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,557,254 A | 9/1996 | Johnson |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,122 A | 6/1997 | Shah |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,684,951 A | 11/1997 | Goldman |
| 5,689,245 A | 11/1997 | Noreen |
| 5,689,269 A | 11/1997 | Norris |
| 5,689,809 A | 11/1997 | Grube |
| 5,699,053 A | 12/1997 | Jonsson |
| 5,727,057 A | 3/1998 | Emery |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,774,824 A | 6/1998 | Streit |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,801,700 A | 9/1998 | Ferguson |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,926,118 A | 7/1999 | Hayashida |
| 5,930,250 A | 7/1999 | Klok |
| 5,944,768 A | 8/1999 | Ito |
| 5,953,398 A | 9/1999 | Hill |
| 5,960,362 A | 9/1999 | Grob |

(56) References Cited

U.S. PATENT DOCUMENTS

| | | |
|---|---|---|
| 5,974,054 A | 10/1999 | Couts |
| 5,978,685 A | 11/1999 | Laiho |
| 5,982,301 A | 11/1999 | Ohta |
| 5,983,099 A | 11/1999 | Yao |
| 5,983,109 A | 11/1999 | Montoya |
| 5,987,323 A | 11/1999 | Huotari |
| 5,998,111 A | 12/1999 | Abe |
| 5,999,124 A | 12/1999 | Sheynblat |
| 6,002,936 A | 12/1999 | Roel-Ng |
| 6,014,602 A | 1/2000 | Kithol |
| 6,032,051 A | 2/2000 | Hall |
| 6,035,025 A | 3/2000 | Hanson |
| 6,035,253 A | 3/2000 | Hayahi |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,091,957 A | 7/2000 | Larkins |
| 6,101,378 A | 8/2000 | Barabush |
| 6,108,533 A | 8/2000 | Brohoff |
| 6,115,611 A | 9/2000 | Kimoto |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,516 B1 | 1/2001 | Watanabe |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schnieder |
| 6,178,506 B1 | 1/2001 | Quick, Jr. |
| 6,181,935 B1 | 1/2001 | Gossman |
| 6,181,939 B1 | 1/2001 | Ahvenainen |
| 6,182,006 B1 | 1/2001 | Meek |
| 6,182,227 B1 | 1/2001 | Blair |
| 6,185,426 B1 | 2/2001 | Alperovich |
| 6,188,354 B1 | 2/2001 | Soliman |
| 6,188,752 B1 | 2/2001 | Lesley |
| 6,188,909 B1 | 2/2001 | Alananra |
| 6,188,957 B1 | 2/2001 | Bechtolsheim |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,204,844 B1 | 3/2001 | Fumarolo |
| 6,205,330 B1 | 3/2001 | Windbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feaugue |
| 6,249,680 B1 | 6/2001 | Wax |
| 6,249,742 B1 | 6/2001 | Frriederich |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,278,936 B1 | 8/2001 | Jones |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,317,684 B1 | 11/2001 | Roeseler |
| 6,321,091 B1 | 11/2001 | Holland |
| 6,321,092 B1 | 11/2001 | Fitch |
| 6,321,158 B1 | 11/2001 | DeLorme |
| 6,321,257 B1 | 11/2001 | Kotola |
| 6,324,542 B1 | 11/2001 | Wright, Jr. et al. |
| 6,327,473 B1 | 12/2001 | Soliman |
| 6,327,479 B1 | 12/2001 | Mikkola |
| 6,331,825 B1 | 12/2001 | Ladner |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,366,782 B1 | 4/2002 | Fumarolo |
| 6,366,856 B1 | 4/2002 | Johnson |
| 6,367,019 B1 | 4/2002 | Ansell |
| 6,370,389 B1 | 4/2002 | Isomursu |
| 6,377,209 B1 | 4/2002 | Krasner |
| 6,397,143 B1 | 5/2002 | Paschke |
| 6,400,314 B1 | 6/2002 | Krasner |
| 6,400,943 B1 | 6/2002 | Montoya |
| 6,400,958 B1 | 6/2002 | Isomursu |
| 6,411,254 B1 | 6/2002 | Moeglein |
| 6,415,224 B1 | 7/2002 | Wako |
| 6,421,002 B2 | 7/2002 | Krasner |
| 6,427,001 B1 | 7/2002 | Contractor |
| 6,429,808 B1 | 8/2002 | King |
| 6,433,734 B1 | 8/2002 | Krasner |
| 6,434,381 B1 | 8/2002 | Moore |
| 6,441,752 B1 | 8/2002 | Fomukong |
| 6,442,384 B1 | 8/2002 | Shah |
| 6,442,391 B1 | 8/2002 | Johansson |
| 6,449,473 B1 | 9/2002 | Raivisto |
| 6,449,476 B1 | 9/2002 | Hutchinson, IV |
| 6,456,852 B2 | 9/2002 | Bar |
| 6,463,272 B1 | 10/2002 | Wallace |
| 6,466,788 B1 | 10/2002 | Carlsson |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,556,832 B1 | 4/2003 | Soliman |

(56) References Cited

U.S. PATENT DOCUMENTS

| | | |
|---|---|---|
| 6,560,461 B1 | 5/2003 | Fomukong |
| 6,560,534 B2 | 5/2003 | Abraham |
| 6,563,824 B1 | 5/2003 | Bhatia |
| 6,564,261 B1 | 5/2003 | Gudjonsson |
| 6,570,530 B2 | 5/2003 | Gaal |
| 6,571,095 B1 | 5/2003 | Koodli |
| 6,571,174 B2 | 5/2003 | Rigazio |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,423 B1 | 9/2003 | Cooper |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,640,185 B2 | 10/2003 | Tokota |
| 6,643,516 B1 | 11/2003 | Stewart |
| 6,650,288 B1 | 11/2003 | Pitt |
| 6,661,353 B1 | 12/2003 | Gopen |
| 6,661,372 B1 | 12/2003 | Girerd |
| 6,665,540 B2 | 12/2003 | Rantalainen et al. |
| 6,665,541 B1 | 12/2003 | Krasner |
| 6,665,613 B2 | 12/2003 | Duvall |
| 6,665,715 B1 | 12/2003 | Houri |
| 6,671,620 B1 | 12/2003 | Garin |
| 6,677,894 B2 | 1/2004 | Sheynblat |
| 6,680,694 B1 | 1/2004 | Knockheart |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,652 B1 | 4/2004 | Sanqunetti |
| 6,721,716 B1 | 4/2004 | Gross |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,766,174 B1 | 7/2004 | Kenyon |
| 6,771,639 B1 | 8/2004 | Holden |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,801,850 B1 | 10/2004 | Wolfson |
| 6,804,524 B1 | 10/2004 | Vandermaijden |
| 6,807,534 B1 | 10/2004 | Erickson |
| 6,810,323 B1 | 10/2004 | Bullock |
| 6,810,405 B1 | 10/2004 | LaRue |
| 6,813,264 B2 | 11/2004 | Vassilovski |
| 6,813,501 B2 | 11/2004 | Kinnunen |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,816,782 B1 | 11/2004 | Walters |
| 6,819,919 B1 | 11/2004 | Tanaka |
| 6,820,269 B2 | 11/2004 | Baucke et al. |
| 6,829,475 B1 | 12/2004 | Lee |
| 6,829,532 B2 | 12/2004 | Obradovich |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,839,630 B2 | 1/2005 | Sakamoto |
| 6,842,696 B2 | 1/2005 | Silvester |
| 6,842,715 B1 | 1/2005 | Gaal |
| 6,845,321 B1 | 1/2005 | Kerns |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,329 B1 | 5/2005 | Wolfson |
| 6,898,516 B2 | 5/2005 | Pechatnikov |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,910,818 B2 | 6/2005 | McLoone |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,925,603 B1 | 8/2005 | Naito |
| 6,930,634 B2 | 8/2005 | Peng |
| 6,934,705 B2 | 8/2005 | Tu |
| 6,937,187 B2 | 8/2005 | Van Diggelen |
| 6,937,872 B2 | 8/2005 | Krasner |
| 6,940,950 B2 | 9/2005 | Dickinson et al. |
| 6,941,144 B2 | 9/2005 | Stein |
| 6,944,535 B2 | 9/2005 | Iwata |
| 6,944,540 B2 | 9/2005 | King |
| 6,947,772 B2 | 9/2005 | Minear |

(56) References Cited

U.S. PATENT DOCUMENTS

| | | |
|---|---|---|
| 6,950,058 B1 | 9/2005 | Davis |
| 6,957,068 B2 | 10/2005 | Hutchinson |
| 6,957,073 B2 | 10/2005 | Bye |
| 6,961,562 B1 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,970,871 B1 | 11/2005 | Rayburn |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,990,081 B2 | 1/2006 | Schaefer |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,058,506 B2 | 6/2006 | Kawase |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,089,110 B2 | 8/2006 | Pechatnikov |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,466 B1 | 11/2006 | Gao |
| 7,136,838 B1 | 11/2006 | Peinado |
| 7,142,163 B2 | 11/2006 | Fukano et al. |
| 7,142,196 B1 | 11/2006 | Connor |
| 7,142,205 B2 | 11/2006 | Chithambaram |
| 7,145,900 B2 | 12/2006 | Nix |
| 7,151,946 B2 | 12/2006 | Maggenti |
| 7,167,187 B2 | 1/2007 | Scott |
| 7,171,220 B2 | 1/2007 | Belcea |
| 7,171,304 B2 | 1/2007 | Wako |
| 7,177,397 B2 | 2/2007 | McCalmont |
| 7,177,398 B2 | 2/2007 | Meer |
| 7,177,399 B2 | 2/2007 | Dawson |
| 7,184,418 B1 | 2/2007 | Baba |
| 7,200,380 B2 | 4/2007 | Havlark |
| 7,202,801 B2 | 4/2007 | Chou |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,245,910 B2 | 7/2007 | Osmo |
| 7,260,186 B2 | 8/2007 | Zhu |
| 7,260,384 B2 | 8/2007 | Bales |
| 7,266,376 B2 | 9/2007 | Nakagawa |
| 7,286,929 B2 | 10/2007 | Staton |
| 7,330,899 B2 | 2/2008 | Wong |
| 7,333,480 B1 | 2/2008 | Clarke |
| 7,340,241 B2 | 3/2008 | Rhodes |
| 7,369,508 B2 | 5/2008 | Parantainen |
| 7,369,530 B2 | 5/2008 | Keagy |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,477,903 B2 | 1/2009 | Wilcock |
| 7,495,608 B1 | 2/2009 | Chen |
| 7,522,581 B2 | 4/2009 | Acharya |
| 7,565,157 B1 | 7/2009 | Ortega |
| 7,602,886 B1 | 10/2009 | Beech |
| 7,623,447 B1 | 11/2009 | Faccin |
| 7,627,331 B2 | 12/2009 | Winterbottom |
| 7,653,544 B2 | 1/2010 | Bradley |
| 7,660,321 B2 | 2/2010 | Cortes |
| 7,702,081 B1 | 4/2010 | Klesper |
| 7,711,094 B1 | 5/2010 | Olshansky |
| 7,739,033 B2 | 6/2010 | Murata |
| 7,747,258 B2 | 6/2010 | Farmer |
| 7,751,614 B2 | 7/2010 | Funakura |
| 7,774,003 B1 | 8/2010 | Ortega |
| 7,783,297 B2 | 8/2010 | Ishii |
| 7,822,823 B2 | 10/2010 | Jhanji |
| 7,881,233 B2 | 2/2011 | Bieselin |
| 7,881,730 B2 | 2/2011 | Sheha |
| 7,890,122 B2 | 2/2011 | Walsh |
| 7,895,263 B1 | 2/2011 | Kirchmeier |
| 7,937,067 B2 | 5/2011 | Maier |
| 2001/0011247 A1 | 8/2001 | O'Flaherty |
| 2001/0015756 A1 | 8/2001 | Wilcock |
| 2001/0016849 A1 | 8/2001 | Squibbs |
| 2002/0032036 A1 | 3/2002 | Nakajima |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069239 A1 | 6/2002 | Katada |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086683 A1 | 7/2002 | Kohar |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0130906 A1 | 9/2002 | Miyaki |
| 2002/0158777 A1 | 10/2002 | Flick |
| 2002/0164998 A1 | 11/2002 | Younis |
| 2002/0169539 A1 | 11/2002 | Menard |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0014487 A1 | 1/2003 | Iwakawa |
| 2003/0016804 A1 | 1/2003 | Sheha |
| 2003/0026245 A1 | 2/2003 | Ejzak |
| 2003/0032448 A1 | 2/2003 | Bulthius |
| 2003/0036848 A1 | 2/2003 | Sheha |
| 2003/0036949 A1 | 2/2003 | Kaddeche |
| 2003/0037163 A1 | 2/2003 | Kitada |
| 2003/0040272 A1 | 2/2003 | Lelievre |
| 2003/0045327 A1 | 3/2003 | Kobayashi |
| 2003/0054835 A1 | 3/2003 | Gutowski |
| 2003/0060938 A1 | 3/2003 | Duvall |
| 2003/0065788 A1 | 4/2003 | Salomaki |
| 2003/0072318 A1 | 4/2003 | Lam |
| 2003/0078054 A1 | 4/2003 | Okuda |
| 2003/0078064 A1 | 4/2003 | Chan |
| 2003/0081557 A1 | 5/2003 | Mettala |
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125064 A1 | 7/2003 | Koskinen |
| 2003/0126250 A1 | 7/2003 | Jhanji |

(56) References Cited

U.S. PATENT DOCUMENTS

| | | |
|---|---|---|
| 2003/0137961 A1 | 7/2003 | Tsirtsis |
| 2003/0149526 A1 | 8/2003 | Zhou |
| 2003/0151501 A1 | 8/2003 | Teckchandani |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165254 A1 | 9/2003 | Chen |
| 2003/0182053 A1 | 9/2003 | Swope |
| 2003/0186709 A1 | 10/2003 | Rhodes |
| 2003/0196105 A1 | 10/2003 | Fineburg |
| 2003/0201931 A1 | 10/2003 | Durst |
| 2003/0204640 A1 | 10/2003 | Sahineja |
| 2003/0223381 A1 | 12/2003 | Schroderus |
| 2003/0231190 A1 | 12/2003 | Jawerth |
| 2003/0236618 A1 | 12/2003 | Kamikawa |
| 2004/0002326 A1 | 1/2004 | Maher |
| 2004/0002814 A1 | 1/2004 | Gogic |
| 2004/0008225 A1 | 1/2004 | Cambell |
| 2004/0021567 A1 | 2/2004 | Dunn |
| 2004/0032485 A1 | 2/2004 | Stephens |
| 2004/0041729 A1 | 3/2004 | Rowitch |
| 2004/0043775 A1 | 3/2004 | Kennedy |
| 2004/0044623 A1 | 3/2004 | Wake |
| 2004/0047342 A1 | 3/2004 | Gavish |
| 2004/0047461 A1 | 3/2004 | Weisman et al. |
| 2004/0054428 A1 | 3/2004 | Sheha |
| 2004/0068724 A1 | 4/2004 | Gardner |
| 2004/0076277 A1 | 4/2004 | Kuusinen |
| 2004/0098497 A1 | 5/2004 | Banet |
| 2004/0124977 A1 | 7/2004 | Biffar |
| 2004/0132465 A1 | 7/2004 | Mattila |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0186880 A1 | 9/2004 | Yamamoto |
| 2004/0190497 A1 | 9/2004 | Knox |
| 2004/0198332 A1 | 10/2004 | Lundsgaard |
| 2004/0198375 A1 | 10/2004 | Schwengler |
| 2004/0198386 A1 | 10/2004 | Dupray |
| 2004/0204829 A1 | 10/2004 | Endo |
| 2004/0204847 A1 | 10/2004 | Yanai |
| 2004/0205151 A1 | 10/2004 | Sprigg |
| 2004/0205517 A1 | 10/2004 | Lampert |
| 2004/0220957 A1 | 11/2004 | McDonough |
| 2004/0229632 A1 | 11/2004 | Flynn |
| 2004/0242238 A1 | 12/2004 | Wang |
| 2004/0267445 A1 | 12/2004 | De Luca |
| 2005/0027445 A1 | 2/2005 | McDonough |
| 2005/0028034 A1 | 2/2005 | Gantman |
| 2005/0031095 A1 | 2/2005 | Pietrowics |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0053209 A1 | 3/2005 | D'Evelyn |
| 2005/0062636 A1 | 3/2005 | Conway |
| 2005/0063519 A1 | 3/2005 | James |
| 2005/0071671 A1 | 3/2005 | Karaoguz |
| 2005/0078612 A1 | 4/2005 | Lang |
| 2005/0083911 A1 | 4/2005 | Grabelsky |
| 2005/0085999 A1 | 4/2005 | Onishi |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0125148 A1 | 6/2005 | Van Buer |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0159883 A1 | 7/2005 | Humphries |
| 2005/0174991 A1 | 8/2005 | Keagy |
| 2005/0190746 A1 | 9/2005 | Xiong |
| 2005/0190892 A1 | 9/2005 | Dawson |
| 2005/0192822 A1 | 9/2005 | Hartenstein |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0219067 A1 | 10/2005 | Chung |
| 2005/0232252 A1 | 10/2005 | Hoover |
| 2005/0239458 A1 | 10/2005 | Hurtta |
| 2005/0242168 A1 | 11/2005 | Tesavis |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0019724 A1 | 1/2006 | Bahl |
| 2006/0023747 A1 | 2/2006 | Koren et al. |
| 2006/0026288 A1 | 2/2006 | Acharya |
| 2006/0041375 A1 | 2/2006 | Witmer |
| 2006/0053225 A1 | 3/2006 | Poikselka |
| 2006/0058102 A1 | 3/2006 | Nguyen et al. |
| 2006/0068753 A1 | 3/2006 | Karpen |
| 2006/0069503 A1 | 3/2006 | Suomela |
| 2006/0072729 A1 | 4/2006 | Lee et al. |
| 2006/0074547 A1 | 4/2006 | Kaufman |
| 2006/0077911 A1 | 4/2006 | Shaffer |
| 2006/0088152 A1 | 4/2006 | Green |
| 2006/0104306 A1 | 5/2006 | Adamczkk |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0200359 A1 | 9/2006 | Khan |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0233338 A1 | 10/2006 | Venkata |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0259365 A1 | 11/2006 | Agarwal et al. |
| 2006/0268120 A1 | 11/2006 | Funakura |
| 2006/0270421 A1 | 11/2006 | Phillips |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0004461 A1 | 1/2007 | Bathina |
| 2007/0014282 A1 | 1/2007 | Mitchell |
| 2007/0019614 A1 | 1/2007 | Hoffman |
| 2007/0021908 A1 | 1/2007 | Jaugilas |
| 2007/0022011 A1 | 1/2007 | Altberg et al. |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0032244 A1 | 2/2007 | Counts |
| 2007/0036139 A1 | 2/2007 | Patel |
| 2007/0049288 A1 | 3/2007 | Lamprecht |
| 2007/0054676 A1 | 3/2007 | Duan |
| 2007/0060097 A1 | 3/2007 | Edge |
| 2007/0072553 A1 | 3/2007 | Barbera |
| 2007/0081635 A1 | 4/2007 | Croak |
| 2007/0083911 A1 | 4/2007 | Madden |
| 2007/0115941 A1 | 5/2007 | Patel |
| 2007/0121601 A1 | 5/2007 | Kikinis |
| 2007/0139411 A1 | 6/2007 | Jawerth |
| 2007/0149166 A1 | 6/2007 | Turcotte |
| 2007/0149213 A1 | 6/2007 | Lamba |
| 2007/0162228 A1 | 7/2007 | Mitchell |

(56) References Cited

U.S. PATENT DOCUMENTS

| | | |
|---|---|---|
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0208687 A1 | 9/2007 | O'Connor |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0032703 A1 | 2/2008 | Krumm |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0077324 A1 | 3/2008 | Hatano |
| 2008/0117859 A1 | 5/2008 | Shahidi |
| 2008/0129475 A1 | 6/2008 | Breed |
| 2008/0162637 A1 | 7/2008 | Adamczyk |
| 2008/0176582 A1 | 7/2008 | Ghai |
| 2008/0186164 A1 | 8/2008 | Emigh |
| 2008/0195314 A1 | 8/2008 | Green |
| 2008/0200182 A1 | 8/2008 | Shim |
| 2008/0214202 A1 | 9/2008 | Toomey |
| 2008/0220747 A1 | 9/2008 | Ashkenazi |
| 2008/0288166 A1 | 11/2008 | Onishi |
| 2009/0003535 A1 | 1/2009 | Grabelsky |
| 2009/0067417 A1 | 3/2009 | Kalavade |
| 2009/0097450 A1 | 4/2009 | Wallis |
| 2009/0113346 A1 | 4/2009 | Wickramasuriya |
| 2009/0128404 A1 | 5/2009 | Martino |
| 2009/0177557 A1 | 7/2009 | Klein |
| 2009/0224931 A1 | 9/2009 | Dietz |
| 2009/0298488 A1 | 12/2009 | Snapp |
| 2009/0328163 A1 | 12/2009 | Preece |
| 2010/0002846 A1* | 1/2010 | Ray et al. ............ 379/37 |
| 2010/0003958 A1* | 1/2010 | Ray et al. ............ 455/404.2 |
| 2010/0003976 A1 | 1/2010 | Zhu |
| 2010/0004993 A1 | 1/2010 | Troy |
| 2010/0042592 A1 | 2/2010 | Stolz |
| 2010/0067444 A1 | 3/2010 | Faccin |
| 2010/0167760 A1 | 7/2010 | Kim |
| 2010/0188992 A1 | 7/2010 | Raleigh |
| 2010/0268848 A1 | 10/2010 | Maurya |
| 2011/0113060 A1 | 5/2011 | Martini |
| 2011/0142207 A1* | 6/2011 | Goldman et al. ........ 379/45 |
| 2011/0165861 A1 | 7/2011 | Wilson et al. |
| 2012/0149324 A1* | 6/2012 | Daly ............ 455/404.1 |
| 2012/0237002 A1* | 9/2012 | Sennett et al. ........ 379/45 |
| 2013/0188783 A1* | 7/2013 | Boni et al. ........ 379/45 |

FOREIGN PATENT DOCUMENTS

| | | |
|---|---|---|
| WO | WO02/11407 | 2/2002 |
| WO | WO2004/025941 | 3/2004 |
| WO | WO2005051033 | 6/2005 |
| WO | WO2007/027166 | 3/2007 |

OTHER PUBLICATIONS

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

$3^{rd}$ Generation Partnership Project 2, Position Determination Service Standard for Dual Mode Spread Spectrum Systems, Feb. 16, 2001, pp. i—X, 1-1—1-5, 2-1—2-2, 3-1—3-51, 4-1—4-66, A-1—A-2, B-1—B-2, C-1—C-2, D-1—D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Extended European Search Report from EPO in European Appl. No. 06827172.5 dated Dec. 29, 2009.

Qualcomm CDMA Technologies, LBS Control Plane/User Plane Overview—80-VD378-1NP B, 2006, pp. 1-36.

Bhalla et al, Telus, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, BS Roaming Summit, Sep. 19, 2006.

Nars Haran, U.S. Cellular, Packet Data—Roaming and LBS Overview, Nov. 2, 2007, pp. 1-15.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Examiner's Office Letter in Japanese Patent Application No. 2006-542691 dated Sep. 7, 2009.

JP Laid-Open Gazette No. 2004-158947 (English abstract only).

JP Laid-Open Gazette No. 2007-507123 (counterpart English text US Patent Application Publication No. 2007/0054676).

T. Hattori, "Wireless Broadband Textbook," IDG Japan, Jun. 10, 2006, p. 142-p. 143. (no English text).

Schulzrinne et al., Emergency Services for Internet Telephony Systems draft-schulzrinne-sipping-emergency-arch, IETF Standard Working Draft, Feb. 4, 2004, 1-22.

* cited by examiner

NO RESPONDERS ONLINE

The present invention claims priority from U.S. Provisional No. 61/615,567 entitled "Rapid Assignment Dynamic Ownership Queue" to Cuff et al., filed Mar. 26, 2012; U.S. Provisional No. 61/615,576 entitled "Configurable Escalation Queue" to Cuff et al., filed Mar. 26, 2012; and U.S. Provisional No. 61/615,580 entitled "No Responders Online" to Cuff et al., filed Mar. 26, 2012, the entirety of all of which are expressly incorporated herein by reference.

BACKGROUND OF THE INVENTION

1. Field of the Invention

This invention relates generally to emergency messaging. More particularly, it relates to queue mechanisms and queue control for systems that have multiple users capable of doing work for any given item inserted into the queue mechanism.

2. Background of Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

The current 911 infrastructure is designed to route a live voice call to a local public safety answering point (PSAP), with location data typically staged in a database that is queried by the PSAP to determine location information. More recently the possibility of text messaging an emergency message to '911' has become a reality. But the handling of emergency text messages by a public safety answering point is in its infancy, with much to be improved upon.

For instance, existing queue mechanisms for assigning responsibility to handle an incoming emergency text message is believed by the present inventors to be too slow and too inflexible. The lack of speed and flexibility comes from the use of a conventional queuing mechanism to handle incoming emergency text messages, which the current inventors have appreciated adds overhead to transactions made from the queue, costing time. Conventionally a first-available PSAP operator is given responsibility for an incoming emergency text message, and handles disposition of the needs of that emergency texter. Once assigned to that PSAP operator, re-assignment of responsibility for that given item (e.g., emergency text message) taken from the queue mechanism is not possible, unless the emergency text is returned to the queue.

The present inventors appreciate that such conventional assignment from an incoming emergency text message queue proves to be a terrible disadvantage in that it does not permit the same queue item (e.g., a given emergency text message) to be taken and worked on by a different recipient device (e.g., another PSAP operator) that may excel at certain needs of the queue item more than others, at various times in its life cycle. If reassignment of a given queued item (e.g., an emergency text message) is enabled, it is conventionally not as fast as the inventors herein feel it could be for the same reason that initial assignment is not fast: the re-assignment of any given transaction taken from the queuing mechanism (e.g., a given emergency text message) must be completed first, before a new 'owner' device can take that same queued item and perform work for it.

SUMMARY OF THE INVENTION

In accordance with the principles of the present invention, a method of rerouting emergency services incoming text message responsibility in an event that terminals at a given service bureau are unavailable for use comprises queuing incoming text messages destined for a given service bureau, at a network server. The queued incoming text messages are re-assigned to a geographically related service bureau when all possible responsive terminal devices at the given service bureau indicate that they are offline.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
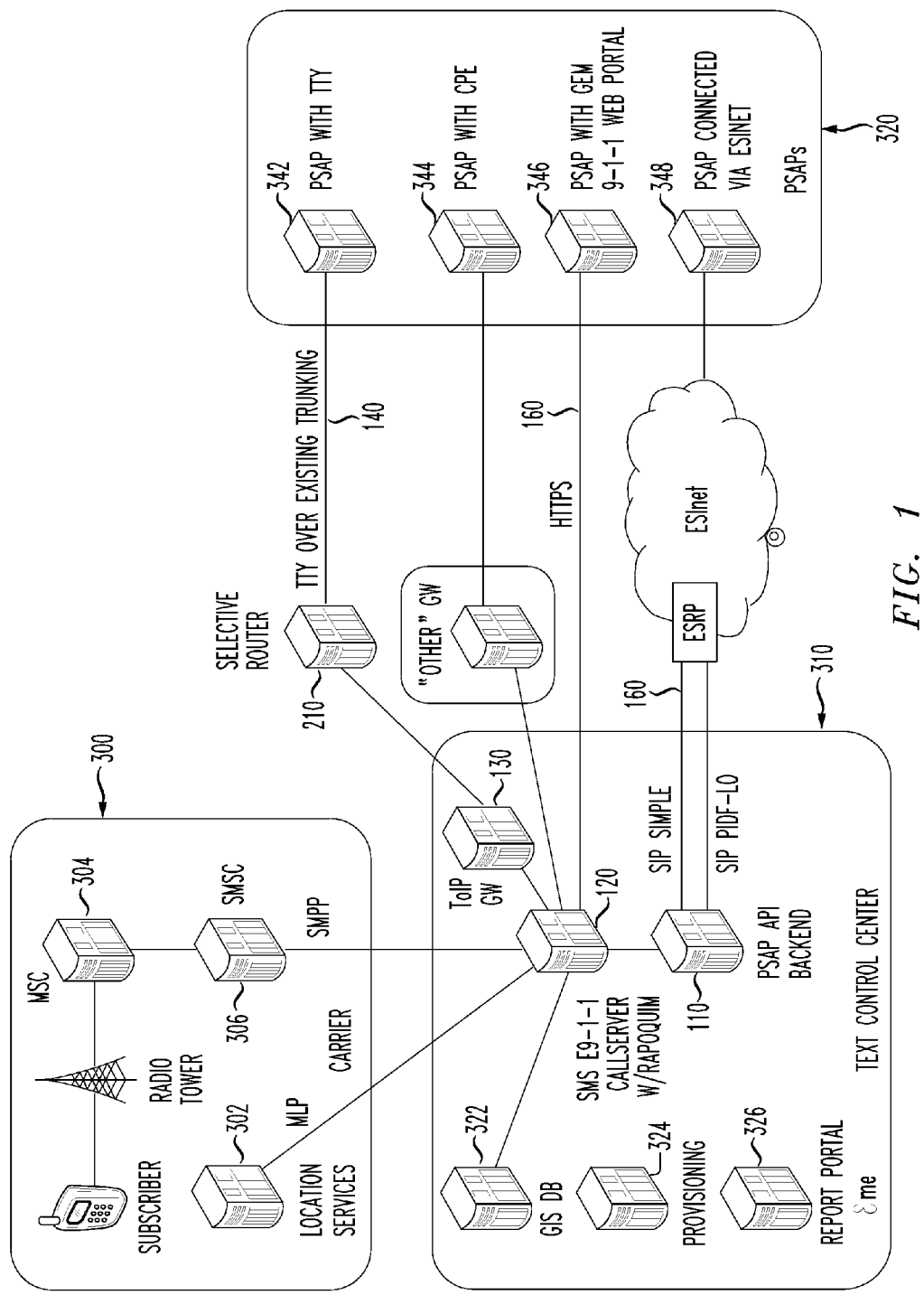
FIG. 1 shows a short message service (SMS) 9-1-1 system including rapid assignment queuing, in accordance with the principles of the present invention.

FIG. 1 shows a text message service (e.g., short message system (SMS)) 9-1-1 system including rapid assignment queuing, in accordance with the principles of the present invention.

As shown in FIG. 1, an emergency text message service system 310 communicates with a given carrier 300 from which a given emergency text messaging device is provided service, and a network of public safety answering points (PSAPs) 320.

The relevant devices within the carrier network 300 include location services gateways 302, a mobile switching center (MSC) 304, a short message service center (SMSC) 306, and a radio tower(s) 308 that communicate directly with a given subscriber wireless device 309 attempting to submit an emergency text message.

The emergency text message service system (aka emergency text control center) 310 includes a text message call server 120 that communicates with the SMSC 306 and location services 302 of the carrier 300. The text message call server 120 also communicates with a global information system (GIS) database, a provisioning device 324, and a reporting portal 326. The text message call server 120 also communicates with a PSAP API backend 110, and a ToIP gateway 130.

The emergency text message service system 310 is a scalable standards-compliant service that supports automatic call routing and delivery of SMS messages to the public safety answering point (PSAP) nearest to a given wireless SMS texter's location. The PSAP call taker sees the wireless SMS device's relevant information, including location information, displayed in the same way that the call taker does for a wireless call dependent on the interface solution that is utilized by the PSAP. The SMS 9-1-1 system is preferably interoperable with Next Generation 9-1-1 networks.

There are four options for a PSAP to interconnect with the emergency text message service system 310: SMS to teletype (TTY) conversion; Direct integration with customer premises equipment (CPE) e.g., NENA i3); PSAP SMS opt out; and/or SMS using a geospatial emergency management (GEM) 9-1-1 client (web browser). Thus, the PSAPs 320 are serviced by the emergency text message service system 310 via multiple different services: a PSAP with TTY 342, a PSAP with CPE 344, a PSAP with geospatial emergency management (GEM) 9-1-1 web portal 346, and a PSAP connected via ESInet 348.

The emergency text message service system 310 automatically call routes a text message to the appropriate PSAP, based on the coarse location of the endpoint. The emergency text message service system 310 delivers the text messages to the appropriate PSAP over the appropriate interface 342, 344, 346 or 348. The emergency text message service system 310 provides a session-like experience for the PSAP operators interacting with the person who is texting. The emergency text message service system 310 supports PSAP requests for updated location information, reports portal for the carrier, and supports automatic bounce-back message.

The emergency text message service system 310 system comprises a geospatial emergency manager (GEM) 9-1-1 backend 110, a teletype (TTY) gateway 130, and an SMS 9-1-1 call server 120.

The geospatial emergency manager (GEM) 9-1-1 backend 110 delivers the content for a geospatial emergency manager (GEM) client application.

The teletype (TTY) gateway 130 receives text messages (e.g., SMS text messages) and converts to teletype (TTY)/Baudot traffic to be sent to the peering network provider for routing to the appropriate PSAP who have selected TTY as their interface type.

The SMS 9-1-1 call server 120 determines the initial handling of a new SMS conversation and maintains and manages the ongoing text sessions (session management). The SMS 9-1-1 call server 120 is a core element of the emergency text message service system 310.

Interfaces provided to a supported PSAP include a teletype (TTY) legacy interface 140, a geospatial emergency manager (GEM) 9-1-1 over HTTPs interface 150, and a Direct IP over SIP SIMPLE interface 160.

The TTY legacy interface 140 utilizes an existing E9-1-1 call path through a selective router 210 and over existing trunking 140 to the PSAP's customer premises equipment (CPE). The TTY legacy apparatus relies on utilization of access to the appropriate selective router 210 for delivery to the appropriate PSAP. The selection of the access to the appropriate selective router 210 must be pre-determined in agreement with the carrier network 300. PSAPs that select the TTY legacy apparatus utilize an automatic location identification (ALI) link to obtain initial location and updated location. Due to the nature of legacy 5-bit Baudot/TTY, not all ASCII characters that can be entered via SMS can be displayed via Baudot/TTY. For example, @ # * % & < > § are not supported in Baudot/TTY. Additional characters are often not supported dependent on the individual PSAPs TTY implementation/customer premises equipment (CPE).

The geospatial emergency manager (GEM) 9-1-1 over HTTPs interface 150 provides a full feature service enabling PSAP personnel to interact with the public.

The Direct IP over SIP SIMPLE interface 160 provides a full feature service that is directly integrated into a PSAPs infrastructure. The supported PSAPs have access to a web-based HTTPs administration interface for managing GEM 9-1-1 service credentials and policy routing functions/deny lists for both GEM 9-1-1 and TTY services.

Thus, the SMS 9-1-1 service in accordance with the present invention provides location determination, call routing, automatic bounce-back message, and session management, as well as an administration tool.

The location determination of the emergency text message service system 310 automatically requests location via a connection to the carrier's location platform for the purpose of receiving coarse location for initial call routing and precise/best effort for updated location. A call operator at the PSAP is given the ability to request updated location information from their selected interface.

The emergency text message service system 310 automatically call routes an SMS text message to the appropriate PSAP 320, based on the coarse location of the endpoint.

An automatic bounce-back message is provided. The emergency text message service system 310 automatically sends a carrier-dictated standardized message to a subscriber in the cases where there is an attempt to send an SMS text message to 911, and, e.g.: (1) There are no serving PSAPs in the calling wireless device's determined location; (2) The serving PSAP is off-line from the service; (3) The serving PSAP has the calling wireless device's MDN (or other unique identification) in a deny list; (4) The serving PSAP has triggered a session limit; (5) The serving PSAP has triggered a time-of-day rule; or (6) The carrier's location platform did not return a valid location for the subscriber.

The emergency text message service system 310 includes session management for SMS text messages sent to the PSAP to provide a session-like experience for the PSAP 320. The PSAP 320 is given the control to end the session its determination.

A web based administration tool is provided with the emergency text message service system 310. The web based administration tool communicates over the HTTP connection 150 to the PSAP 320 for the following exemplary administrative functions:

(a) Creating GEM 9-1-1 credentials—Creates credentials for users to log into the GEM 9-1-1 service.

(b) Resetting GEM 9-1-1 credentials—Allows for the administrator to reset the password for GEM 9-1-1 user accounts.

(c) Status of GEM 9-1-1 users—Allows for the administrator to view the Logged In status of GEM 9-1-1 users and account status of GEM 9-1-1 users.

(d) Inputting Deny List Entries—Allows for the administrator to input an MDN of a wireless subscriber to always get an automatic bounce back message for all SMS to 9-1-1 attempts for that specific PSAP when that wireless subscriber is call routed to that PSAP.

(e) Quick Message Pre-defined Responses—Allows for the administrator to configure pre-defined canned GEM 9-1-1 responses and sort in a specified order for the pre-defined Quick Messages that show within the GEM 9-1-1 service for that specific PSAP for all GEM 9-1-1 users of that specific PSAP.

(f) Alternate PSAP List—Allows for the administrator to set a list of alternate PSAPs for the primary PSAP to fall back to for new SMS sessions if the primary PSAP has a time-of-day or session limit policy routing function rule that has been triggered. Each PSAP in the alternative PSAP list will be evaluated for their respective online status, policy routing functions and deny list entries and treated accordingly.

(g) Time-of-Day policy routing function rule—Allows for the administrator to set a time of day policy for a window of time where the PSAP will not receive any new SMS sessions. A new SMS session's attempt to the PSAP with the time-of-day policy routing function triggered will result in either an automatic bounce back message being sent back to the wireless subscriber, or the new SMS session routed to a PSAP listed in an alternate PSAP list.

(h) Session Limit policy routing function rule—Enables the administrator to set an SMS session limit for the PSAP. New SMS session attempts to the PSAP over the established SMS session limit will thus trigger the SMS session limit policy routing function. This results in an automatic bounce back message sent back to the wireless subscriber, or the new SMS session that is over the session limit will be sent to the PSAP listed in the alternative PSAP list.

The session management feature of the emergency text message service system 310 includes a novel emergency text message queue within the text message call server 120 that enables multiple users to self-assign or self-re-assign queue items (e.g., incoming emergency text messages) instantly, simply, and intuitively, by simply performing the work they desire to do against the target queued emergency text message, without first having to perform, or waiting for an administrator to perform, separate and preliminary ownership transactions. This emergency text message self-assigning queue, more broadly referred to herein as a rapid assignment dynamic ownership queue, is also given the acronym "RADOQIM" to stand for Rapid Assignment Dynamic Ownership Queue Item Mechanism (RADOQIM).

The rapid assignment dynamic ownership queue eliminates wasteful time and overhead that are conventionally required to first assign items (e.g., emergency text messages) to an application user device (e.g., a text-message-capable PSAP operator), in separate and preliminary ownership transactions, before the PSAP operator can perform any work. Simply put, conventional user devices (e.g., PSAP terminals 342-348) have to wait for ownership, or, perform ownership transactions themselves, before real work on the emergency text message can be accomplished. The PSAP terminals are not able to execute the real transactions against their target queue item (emergency text message) until after the ownership of that emergency text message is taken care of.

The rapid assignment dynamic ownership queue also eliminates wasteful time and overhead that are typically required to first re-assign an emergency text message to a PSAP operator terminal, in separate and preliminary ownership transactions, before the PSAP operator, in this case, the new owner of the queued emergency text message, can perform their job. Simply put, conventional re-assignment of queued items (emergency text messages) requires waiting for the ownership transfer to complete before a new PSAP operator can execute on that same emergency text message or emergency text message session. And that would be if that conventional emergency text message queue would allow re-assignment of an emergency text message. If reassignment is not allowed then even more time and overheard are wasted. The assigned emergency text message is essentially destroyed or archived and a new queued emergency text message is created for the new PSAP operator.

The emergency text message service system 310, commercially available from TeleCommunication Systems, Inc. of Annapolis, Md. called GEM911, handles queue item assignment (e.g., emergency text message session assignment) and ownership. GEM911 implements a rapid assignment dynamic ownership queue in a PSAP operator terminal via, e.g., a web application for handling 911 related text messages sent from mobile devices. Implementation of the GEM911 web application was achieved using specific software technologies such as Ruby on Rails and SQLLite, but is not limited in implementation to any particular technology. The inventive methods and apparatus explained herein may be implemented in any software technologies to achieve the most flexible, rapid, and dynamic queue item ownership mechanism possible. Similarly, the content or purpose of any rapid assignment dynamic ownership queue system is not limited to use in 911 emergency or Public Safety Answering Points, but rather may be used in other multiple user environments regardless of the nature or content of the queued items.

The rapid assignment dynamic ownership queue is unique because it makes work on queued items the dog, and assignment of the queued items the tail, instead of the other way around. Conventionally, assignment of a queued item happens first and work happens thereafter. The rapid assignment dynamic ownership queue enables the work to happen first and the assignment instantly updates as a result of the work. Zero time, zero overhead.

The "rapid assignment" aspect of the rapid assignment dynamic ownership queue refers to zero time required for assignment. The assignment is instant, thus zero overhead. The assignment process is gone. Preliminary ownership transactions are not required. The queue item is assigned to the user device (e.g., PSAP station) that successfully completed work against it. When a user device (e.g., PSAP station) wants a queue item the user does what they know needs to be done. For example, in the GEM911 application, the user device responds to a given emergency text message. No more waiting for the item to be assigned to a given PSAP operator station. You want it? Work on it! By virtue of successfully completing work, the queue item will belong to that PSAP station. Start work now and the assignment will follow in a blink.

The "dynamic ownership" aspect of the rapid assignment dynamic ownership queue means that just like with initial assignment, the user device that wants it, works on it, regardless of the message or message session's previous ownership. The re-assignment is achieved instantly, and notification is given to the previous owner device (e.g., PSAP station), by virtue of the work that was completed against the queue item by the new owner device. Just like in initial assignment. In the case of GEM911, a second PSAP operator responds to an emergency text message, even though a different, that is, first, PSAP operator already sent a response earlier. The queue item is instantly reassigned to the second PSAP operator with no overhead transactions related to ownership.

There is no "taking" or "assigning" of queue items with the rapid assignment dynamic ownership queue. Only working. To take a queue item, the PSAP station must complete work on it. A user device can select a queue item, but until a work transaction has been successfully completed and committed against the target queued item (or session), that user device has done nothing but look at the queue item.

Any application user device can perform work on any target queue item. The "owner" is simply the last user device (e.g., PSAP station) to have completed work against the queue item.

Figure 2:
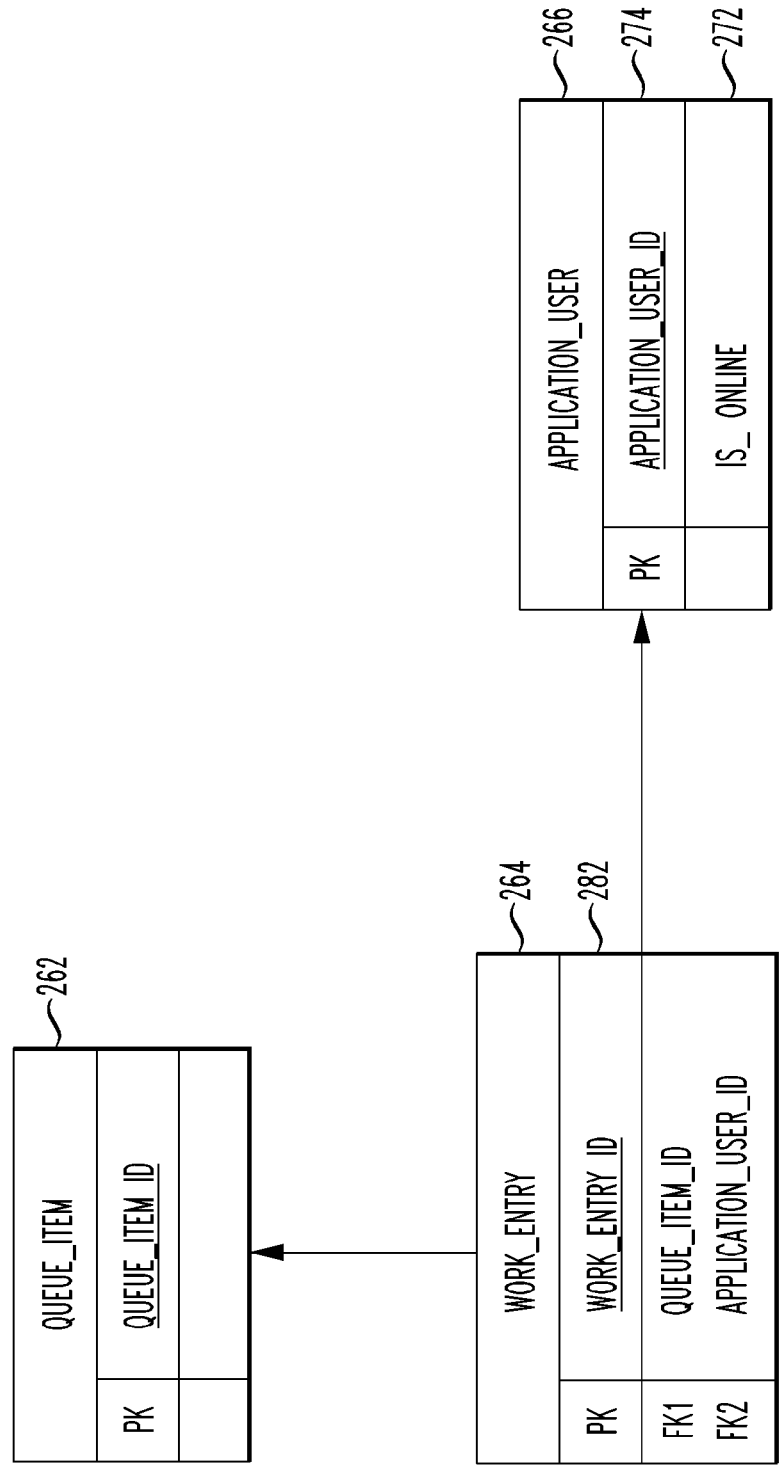
FIG. 2 shows a database table structure for the rapid assignment dynamic ownership queue, in accordance with the principles of the present invention.

FIG. 2 shows a database table structure for the exemplary rapid assignment dynamic ownership queue, in accordance with the principles of the present invention.

Exemplary embodiments of a rapid assignment dynamic ownership queue in accordance with the principles of the present invention uses three (3) relational database tables as shown in FIG. 2. Any database technology can be used to create these tables. Any server application or other network device may implement a rapid assignment dynamic ownership queue with renamed database tables as best fits the specific domain space.

Queue_Item 262 is the first table (keeping in mind that the specific table names used herein are generic for the purposes of this disclosure.) The Queue_Item table can have any table name, and as many or as little fields as needed, to support the specific requirements of the given rapid assignment dynamic ownership queue. The Queue_Item 262 must be a parent table, having zero to many child records, to the child Work_Entry table.

Work_Entry 264 is the second database table. The rapid assignment dynamic ownership queue enables the Work_Entry table to have as much flexibility as possible, including the table name itself and the field definition. The only requirement for the rapid assignment dynamic ownership queue is that the Work_Entry 264 must have a required foreign key to the parent Queue_Item table.

The third and final table required by the rapid assignment dynamic ownership queue is an Application_User table. The Application_User 266 is also a parent to the Work_Entry table, also having zero to many child records. The Work_Entry table is required to have a foreign key to Application_User 266 and Queue_Item 262. The Application_User table, in addition to a field needed for its relationship to Work_Entry 264, must have at least one Boolean field. The purpose of this Boolean field is to track if the Application_User 266 is currently logged into the system.

Each Work_Entry record 264 has one and only one reference to Queue_Item parent record 262. Each Work_Entry record 264 also has one and only one reference to Application_User parent record 266.

Each Queue_Item record 262 has zero to many Work_Entry child records 264.

Each Application_User 266 has zero to many Work_Entry child records 264. Each Application_User record 266 also updates the Boolean field Is_Online 272 to true when the user logs into the system and false when the user logs out.

All Primary Keys are numeric, sequential ascending assignment when issuing values.

The content of these tables 262-266 enables a simple database query and categorization of the returning result set, placing each Queue_Item 262 into one of three categories.

There are three critical rapid assignment dynamic ownership queue categories: UNASSIGNED, ASSIGNED TO ME, and ASSIGNED TO OTHERS, in accordance with the principles of the present invention.

An UNASSIGNED queue item is a Queue_Item 262 that has no child Work_Entry record 264—OR—the last Work_Entry child record 264 has foreign key to Application_User record 266 where Is_Online 272=false. The rapid assignment dynamic ownership queue defines "Unassigned" as those Queue_Item records 262 which have no subordinate Work_Entry records 264 what so ever, or, where the last (latest entered, highest Work_Entry_ID 282 value) Work_Entry record 264 was entered by an Application_User 266 not currently online. In other words, where Is_Online 272 is false.

An ASSIGNED TO ME queue item is when a Last Work_Entry record for the Queue_Item 262 maps to Application_User 266 equal to the current user. Is_Online 272=true. The rapid assignment dynamic ownership queue defines "Assigned to Me" as those Queue_Item records 262 where the most recent, that is last, Work_Entry child record 264, was entered by the current user. The current user viewing the queue is obviously online.

An ASSIGNED TO OTHERS queue item is when a Last Work_Entry record for the Queue_Item 262 maps to Application_User 266 that has Is_Online 272=true and the Application_User 266 is not the current user. The rapid assignment dynamic ownership queue defines "Assigned to Others" as Queue_Item records 262 where the most recent, that is last, Work_Entry child record 264, was entered by an Application_User 266 currently online (Is_Online=true) and different from the current user.

Reassignment is as simple as entering more Work_Entry records 264 with a different Application_User_ID 274. The Application_User 266 that successfully created and committed the latest Work_Entry record 264 is the new owner of the parent Queue_Item 262 for which that Work_Entry record 264 belongs.

Un-assignment happens when an Application_User 266 logs off the system. The update to the Application_User 266 record, specifically the Is_Online 272 Boolean being set to false, then causes the Queue_Item records 262 for which the recently logged off user had the last Work_Entry record 264, to be categorized as "Unassigned." The record of that user's Work_Entry 264 is still intact, but because they were the owner, because they were the user for the last Work_Entry record 264, and now they are off line, the Queue_Item 262 becomes unassigned.

Race Conditions do not matter to the rapid assignment dynamic ownership queue. It is always as simple as choosing the last Work_Entry record 264 for a given Queue_Item 262. There is no limit to the number of Work_Entry records 264 that can be entered against a Queue_Item 262. No matter how close together two Work_Entry records 264 were created, one of them will come after the other. The user belonging to the last Work_Entry 264 is the owner of the parent Queue_Item 262.

As a specific example, the GEM911 ™ product developed by the inventors uses specific table names for the E911 domain space. The below example helps to illustrate how the generic model detailed above can be applied to almost any web application that benefits from instant and flexible assignment of queue items in a multi user environment.

Conversation (Queue_Item 262)
Response Messages (Work_Entry 264)
PSAP Operators (Application User 266)

Once a Queue_Item 262 is properly identified into one of the three rapid assignment dynamic ownership queue categories, the Queue_Item 262 can be displayed in whatever way best fits the application. For example, the GEM911 product displays three separate sections for the "Unassigned", "Assigned to Me", and "Assigned to Others" categories. The last two "Assigned" categories display the user name of the current owner, in addition to the core Queue_Item 262 content, in the case of GEM911, the phone numbers that texted 911 for help. The "Unassigned" section displays an empty string (" "). This is only one example of communicating the three categories and the Queue_Items 262 contained therein. Any means of separation and notification are easy to achieve in any kind of graphical user interface (GUI). Condition branches are simply used based on the rapid assignment dynamic ownership queue categorization of the queue items.

The rapid assignment dynamic ownership queue system is highly generic and broadly applicable to any domain space and application content, including processes that use queue items in a multi user environment.

The emergency text message service system 310 may preferably be comprised in a geo-redundant world-class data center in a 24×7×365 hosted environment. The data center may preferably be implemented with redundancy within a site, and geographically diverse. In this way during maintenance windows, only one side need be upgraded or changed and brought back into service, and full functionality confirmed, prior to upgrading/changing the other geo-redundant side.

A rapid assignment dynamic ownership queue in accordance with the present invention allows multiple users to self-assign or self-re-assign queue items instantly, simply, and intuitively, by simply performing the work they desire to do against the target queue item, without first having to perform, or waiting for an administrator to perform, separate and preliminary ownership transactions.

Configurable Escalation Emergency Text Queuing

A problem with queues appreciated by the present inventors is that they are fundamentally relative. In a single column vertical list, as is typical and conventional in queue item related devices, only one item can be on the top of the queue. Any item below the top item might also be extremely important, but this information and the sense of urgency are lost for any item not on the top of the list. There is no system currently in existence that permits the simple configuration of fixed, escalating, prioritization tiers, and the application of those escalating prioritization tiers to queue items in run time. The present inventors have appreciated that what is missing in conventional queue techniques is a way to assign a common fixed prioritization code scheme to all queue items regardless of the relative sort position.

Figure 3:
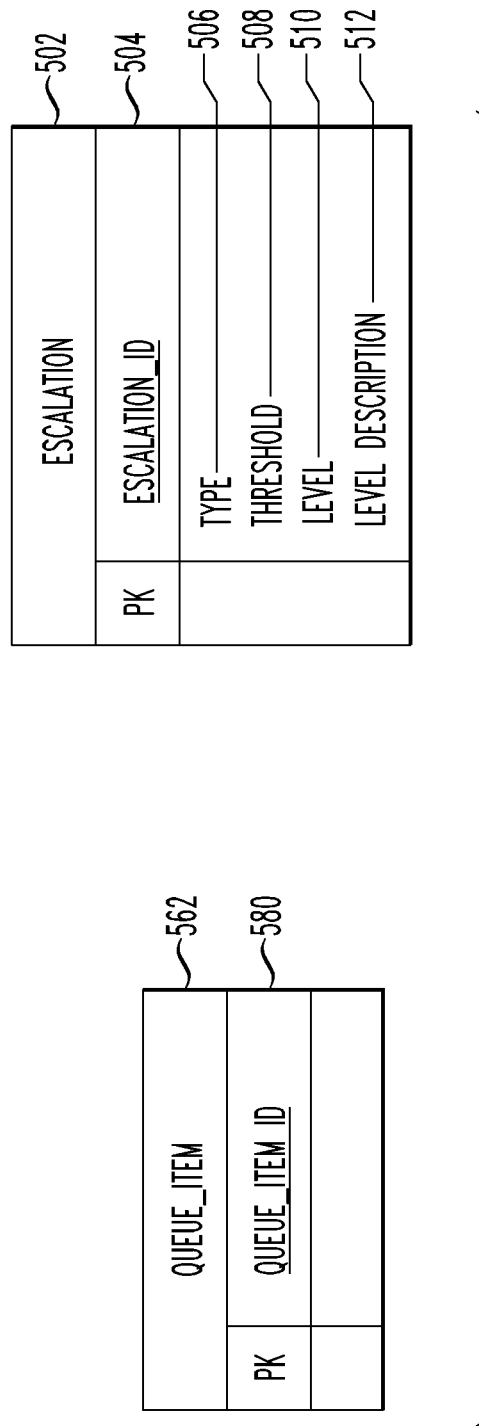
FIG. 3 shows a database table structure for an exemplary configurable escalation queue, in accordance with the principles of the present invention.

FIG. 3 shows an exemplary configurable escalation queue, in accordance with the principles of the present invention.

In particular, as shown in FIG. 3, the configurable escalation queue 562 may or may not be a rapid assignment dynamic ownership queue 262 as shown and described with reference to FIG. 2.

The geospatial emergency management (GEM) 9-1-1 system implements a configurable escalation queue (CEQ) 562 for management of incoming emergency text messages. The configurable escalation queue 562 assigns queue items 580 absolute, not just relative, escalation codes 504.

GEM911 is a public safety answering point (PSAP) operator web server application system for handling 911 related text messages sent from mobile devices. The implementation of the web application was achieved using specific software technologies, such as Ruby on Rails and SQLLite, but is not limited in implementation to any particular software technologies. The unique ideas, designs patterns, data models, and all other explained concepts, can be implemented in any software technologies to achieve an effective escalating priority system for queue items, in accordance with the principles of the present invention. Similarly, the content or purpose of any device using a configurable escalation queue (CEQ) 562 is not limited to 911 or Public Safety Answering Points. Any device that displays queue items will benefit from a configurable escalation queue (CEQ) 562, regardless of the nature or content of the queue items 580 and any special techniques or methods required to assign their prioritization.

The configurable escalation queue (CEQ) 562 is unique as it ranks all queue items 580 in absolute terms, but a relative queue-sorting method still takes place. In this way, a configurable escalation queue (CEQ) 562 enables sorting of queued items 580 according to the needs of their specific domain.

By using the configurable escalation queue (CEQ) 562, each item 580 in the configurable escalation queue (CEQ) 562, regardless of its position within the configurable escalation queue (CEQ) 562, be it first or last in the configurable escalation queue (CEQ) list, has an escalation code 504 associated therewith. This escalation code 504 can easily be used to alter the presentation of the queue item(s) 580 as needed to alert application users (e.g., PSAP operator terminals) of the priority level.

The configurable escalation queue (CEQ) 562 uses two database tables: A Queue_Item database table 562, and an Escalation database table 502. Any database technology can be used to create these database tables. The specific database table names in this document are generic for the purposes of this disclosure. Examples with specific database table names are presented herein, but these specific database table names may be any name.

The Queue_Item database table 562 can have any table name, and as many or as little fields as needed, to support the specific requirements to form a configurable escalation queue (CEQ) 562.

The second database table is the Escalation database table 502. The Escalation database table 502 may be implemented with as much flexibility as possible, including the table name itself and the field definition. The disclosed embodiments of an Escalation database table 502 must include four database fields associated with each escalation code 504: type 506, threshold 508, level 510, and level_description 512.

type 506 is implemented in the disclosed embodiments as a text based field that is used as a filter to determine which kind of Queue_Items 580 the Escalation evaluations should be applied to.

threshold 508 is implemented in the disclosed embodiments as a numeric field that allows an application to compare, as in numeric greater than less than, against values, either stored or calculated, that come from the Queue_Item 580 being evaluated for prioritization.

level 510 is implemented in the disclosed embodiments as a numeric, integer field for the prioritization level. This is the end result of the escalation evaluation.

level_description 512 is implemented in the disclosed embodiments as a text-based field to specify in human readable words what the escalation level 510 means, its definition, its impact, etc.

Once correct content is loaded into the Escalation database table 502, a simple database query is performed against the Escalation table 502. The database query uses two input parameters: type 506 and threshold 508. The type parameter is used for character matching and is compared to the type field 506 of the Escalation records 504. The threshold parameter is used for numeric 'greater than/less than' comparison and is compared to the threshold field 508 of the Escalation records 504.

The type 506 and threshold 508 parameters going into the database query are supplied, by whatever means are best for the specific server, device or other application, from the target Queue_Item 580 or data related to the target Queue_Item 580 being evaluated.

The database query against the Escalation table 502 returns zero to many Escalation records 504. The Escalation record 504 with the highest level value is the escalation level of the target Queue_Item 580. The idea is that as threshold parameter 508 values increase or decrease, more and more Escalation records 504 return from the query, each additional Escalation record 504 adding a higher level 510 value than that of the previous database query. In the case that no Escalation records 504 are returned from the database query, the configurable escalation queue Queue_Item 562 is at the zero level, that is, no escalation, priority level.

In the specific disclosed embodiments using the disclosed GEM911 product, the Escalation table query evaluates each Queue_Item 580 based on a number of seconds since the last response. A different type 506, and therefore a different threshold 508, applies to text messages sent from mobile users to the PSAP and messages sent from the PSAP to mobile users. As the number of seconds since the last response increases, more and more Escalation records 504 return from the query, each with a higher value in the level field 510. This is only one example of how the configurable escalation queue (CEQ) 562 enables the assignment of escalating, absolute prioritization codes to queue items 580.

Because each Queue_Item 580 is assigned an absolute escalation level 510, graphical user interface (GUI) developers may use the level value 510 as a condition to alter the appearance of the Queue_Item 580. In the disclosed embodiments, a flag icon is added to the Queue_Item 580 once the queued item escalates from level 0 to level 1. Also, the Queue_Item 580 begins shakes at level 1. At level 2 the shaking increases in speed and amplitude. At level 3 the shaking increases further. Each and every queue item 580, regardless of queue position, has an escalation level 510 and the GUI can render that Queue_Item 580 in a way that best notifies the application user terminals or devices.

The disclosed configurable escalation queue (CEQ) 562 is highly generic and broadly applicable to any domain space and application content, thus benefiting all devices that use queued items.

No Responders Online

The present inventors have appreciated that existing emergency responder systems typically lack flexibility as they are not dynamic because the scheduling and distribution arrangements between existing emergency systems are all made in advance.

Figure 4:
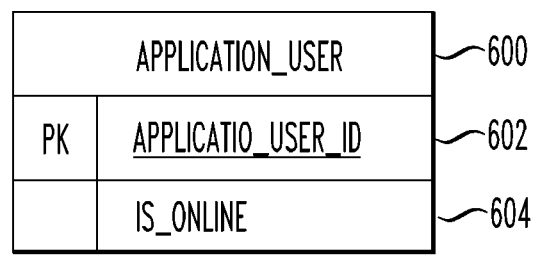
FIG. 4 shows a no responders online (NRO) Application_User table, in accordance with the principles of the present invention.

FIG. 4 shows a no responders online (NRO) Application_User table, in accordance with the principles of the present invention.

A No Responders Online ("NRO") feature of the geospatial emergency management 9-1-1 system tracks and aggregates emergency responder activity across the system, which may be distributed, so that the system can be classified in the simple terms of "offline" or "online." The "offline" response is especially important to emergency responder systems. Any request that comes to a system with no operators online must be sent back with a "we are all offline" answer as soon as possible. Without this safety net, emergency response systems would be unable to progress into geo spatial distribution.

For example, to pass any requests, such as text messages, between neighboring PSAPs, an emergency response system must be able to assess, across the network, the status of the neighboring PSAP system that would potentially take the request. Because the NRO in accordance with the principles of the present invention enables "offline" responses, which enables emergency response systems to make requests to each other, it can be used to significantly improve the flexibility of emergency response systems, such as PSAPs.

The no responders online (NRO) feature issues a short circuit "offline" response to any request made to the emergency system when no users are currently online. Similarly, the no responders online (NRO) attempts to acquire requests that the system was not able to receive while offline, when the first user logs into the system. In other words, when the emergency system goes from "offline" to "online", it tries to play catch up.

The no responders online (NRO) enables individual emergency response systems to be more flexible. Remote responder activity is tracked the same as on site responder activity. The PSAP becomes distributed and still retains the dynamic online, offline answer modes. The use of no emergency responders online (NRO) also enables groups of emergency response systems to network on the fly.

There is no conventional system currently in existence that exhibits the dynamic, run time "online" and "offline" responses to emergency requests.

The present invention provides an emergency response system capable of dynamically issuing "online" and "offline" responses to emergency requests at run time, as driven by responder activity in an emergency system.

The no responders online (NRO) feature has been successfully implemented in the commercial product called GEM911, which is a PSAP operator web application for handling 911 related text messages sent from mobile devices. The implementation of this web application in an emergency network server environment was achieved using specific software technologies, such as Ruby on Rails and SQLLite, but is not limited in implementation to any technologies. The unique ideas, designs patterns, data models, and all other concepts explained in this document, can be implemented in any software technologies to achieve an effective offline response mechanism for emergency systems.

As implemented in the disclosed embodiments, the no responders online (NRO) emergency services feature uses a special field (e.g., a Boolean field) in the Application_User table as shown in FIG. 1. When an application user, such as a PSAP operator, logs into the system, the Boolean is set to true. When the user logs out, or is timed out by lack of activity or some other configurable means, the Boolean is set to false. Simply put, the application tracks when users enter and exit the system. It knows at all times if there is at least one emergency services responder terminal is online.

A simple database query can be used to determine the number of emergency services responder terminal devices currently online. Using this query, a preliminary check can be done against all incoming requests, to see if the "offline" short circuit response should be activated. Every API call visible to the outside world for incoming emergency requests performs this preliminary check before any other processing of the request is performed.

Similarly, when a responder logs into the emergency system, and that user is the first user to log on, the emergency system attempts to acquire requests that the system was not able to receive while offline. Every time a responder logs onto the system, the application checks if that user is the first, that is, if we are going from 0 to 1 currently logged in responders. If so, check if any active request on the network can be acquired and if so take them.

The present invention has particular applicability to emergency response, and emergency systems such as Public Safety Answering Point (PSAP) applications.

While the invention has been described with reference to the exemplary embodiments thereof, those skilled in the art will be able to make various modifications to the described embodiments of the invention without departing from the true spirit and scope of the invention.

What is claimed is:

1. A rapid re-assignment text message session manager server, comprising:
   a text message queue providing simultaneous access to any one text message within said text message queue by a plurality of operator terminals; and
   a text message session manager to self-assign initial ownership of said one text message within said text message queue, as a result of a first acting one of said plurality of operator terminals to complete an action in service to said one text message within said text message queue, and to self-reassign ownership of said one text message within said text message queue to a second acting one of said plurality of operator terminals to subsequently complete another action in service to said one text message within said text message queue.

2. The rapid re-assignment text message session manager server according to claim 1, wherein said text message queue comprises:
a plurality of emergency text messages.

3. The rapid re-assignment text message session manager server according to claim 1, wherein:
said one text message within said text message queue is an oldest one within said text message queue.

4. The rapid re-assignment text message session manager server according to claim 1, wherein:
said text message queue is a configurable escalation queue having an escalation code assigned to each queued text message within said text message queue, regardless of position within said text message queue.

5. The rapid re-assignment text message session manager server according to claim 1, wherein:
said self-reassigned ownership is performed without an administrator terminal performing said reassigned ownership.

6. A method of rapidly re-assigning ownership for text messages in a text message queue, comprising:
queuing a plurality of text messages in a text message queue;
providing simultaneous access to any one of said plurality of text messages within said text message queue, to a plurality of operator terminals;
self-assigning initial ownership of a given one of said plurality of text messages within said text message queue, as a result of a first acting one of said plurality of operator terminals to complete an action in service to said given one of said plurality of text messages within said text message queue; and
self-reassigning ownership of said given one of said plurality of text messages within said text message queue, as a result of a second acting one of said plurality of operator terminals to subsequently complete another action in service to said given one text message within said text message queue.

7. The method of rapidly re-assigning ownership for text messages in a text message queue according to claim 6, wherein said text message queue comprises:
a plurality of emergency text messages.

8. The method of rapidly re-assigning ownership for text messages in a text message queue according to claim 6, wherein:
said given one text message within said text message queue is an oldest one within said text message queue.

9. The method of rapidly re-assigning ownership for text messages in a text message queue according to claim 6, wherein:
said text message queue is a configurable escalation queue having an escalation code assigned to each queued text message within said text message queue, regardless of position within said text message queue.

10. The method of rapidly re-assigning ownership for text messages in a text message queue according to claim 6, wherein:
said self-reassigned ownership is performed without an administrator terminal performing said reassigned ownership.

11. Apparatus for rapidly re-assigning ownership for text messages in a text message queue, comprising:
means for queuing a plurality of text messages in a text message queue;
means for providing simultaneous access to any one of said plurality of text messages within said text message queue, to a plurality of operator terminals;
means for self-reassigning initial ownership of a given one of said plurality of text messages within said text message queue, as a result of a first acting one of said plurality of operator terminals to complete an action in service to said given one of said plurality of text messages within said text message queue; and
means for self-reassigning ownership of said given one of said plurality of text messages within said text message queue, as a result of a second acting one of said plurality of operator terminals to subsequently complete another action in service to said given one text message within said text message queue.

12. The apparatus for rapidly re-assigning ownership for text messages in a text message queue according to claim 11, wherein said text message queue comprises:
a plurality of emergency text messages.

13. The apparatus for rapidly re-assigning ownership for text messages in a text message queue according to claim 11, wherein:
said given one text message within said text message queue is an oldest one within said text message queue.

14. The apparatus for rapidly re-assigning ownership for text messages in a text message queue according to claim 11, wherein:
said text message queue is a configurable escalation queue having an escalation code assigned to each queued text message within said text message queue, regardless of position within said text message queue.

15. The apparatus for rapidly re-assigning ownership for text messages in a text message queue according to claim 11, wherein:
said self-reassigned ownership is performed without an administrator terminal performing said reassigned ownership.

\* \* \* \* \*